June 27, 1967  R. K. GREBE  3,328,661
REVERSIBLE MOTOR CONTROL CIRCUIT
Filed Sept. 21, 1964  3 Sheets-Sheet 1

INVENTOR.
ROBERT KARL GREBE
BY

INVENTOR.
ROBERT KARL GREBE

United States Patent Office 3,328,661
Patented June 27, 1967

3,328,661
REVERSIBLE MOTOR CONTROL CIRCUIT
Robert Karl Grebe, Harrisburg, Pa., assignor to
AMP Incorporated, Harrisburg, Pa.
Filed Sept. 21, 1964, Ser. No. 397,829
7 Claims. (Cl. 318—293)

This invention relates to motor control circuit means and more particularly to an instantaneous motor control circuit means.

When using a motor to control the operation of some device such as a compressing device, it is desirable, in some cases, that the motor be of the reversible type in order to reverse the direction of movement of the compressing device upon completion of an operation. When such a case exists, it is also desirable that the reversible motor be capable of instantaneously reversing its direction so that the operation is not carried beyond a predetermined condition which if it did would have detrimental effects both to the compressing device and the material on which the compressing device is operating.

It is, therefore, an object of the present invention to provide a motor control circuit means which effects instantaneous reversing of a motor controlled thereby.

Another object of the present invention is the provision of a motor control circuit means which effects accurate reversing operation.

A further object of the present invention is to provide a motor control circuit means that is low in cost.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration and principles thereof and the manner of applying it in practical use so that they may modify it in various forms, each as may be best suited to the conditions of a particular use.

This invention will be described in conjunction with the crimping press which is fully disclosed in U.S. Patent application, Ser. No. 317,373, filed Oct. 18, 1963, now U.S. Patent No. 3,266,286 and assigned to the present assignee; however, it is to be understood that the motor control means may be used in connection with any device where motor control means of the type to be described is essential.

Figure 1:
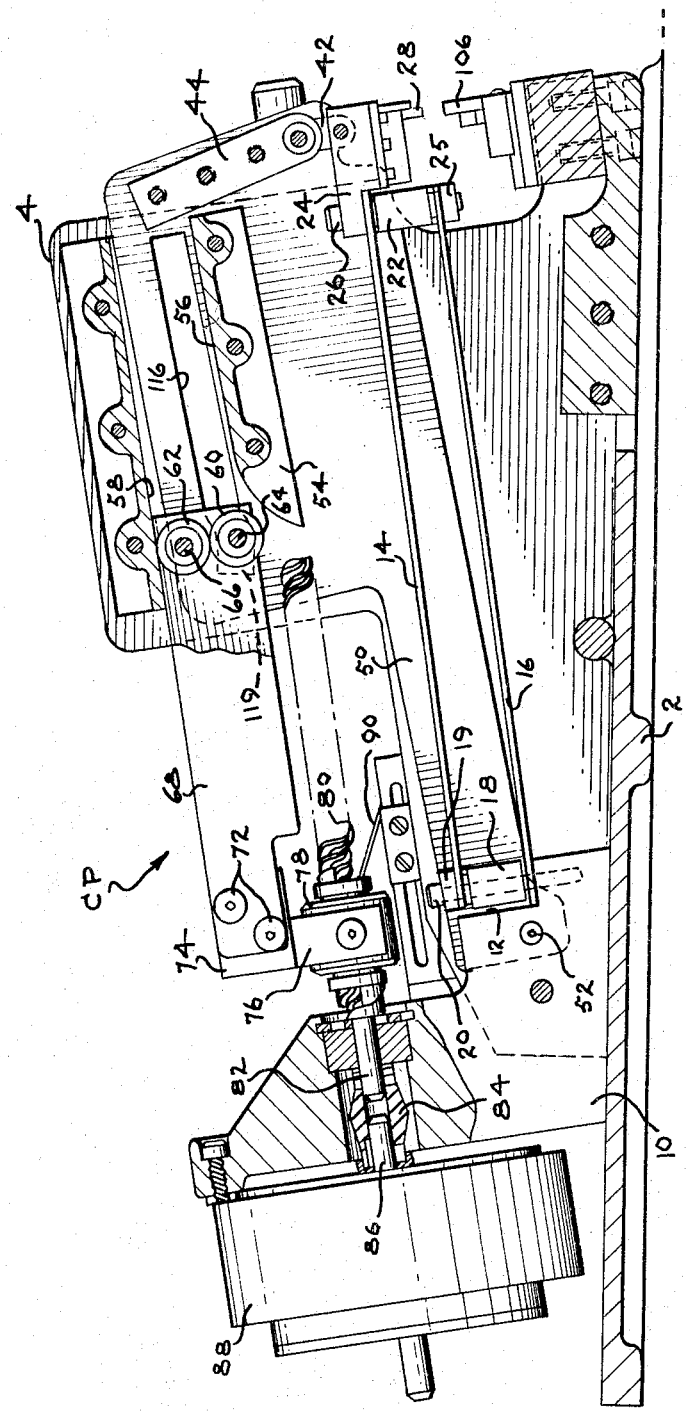
FIGURE 1 is a cross-sectional side elevational view taken along lines 1—1 of FIGURE 2 of a crimping press on which the present invention is used.
Figure 2:
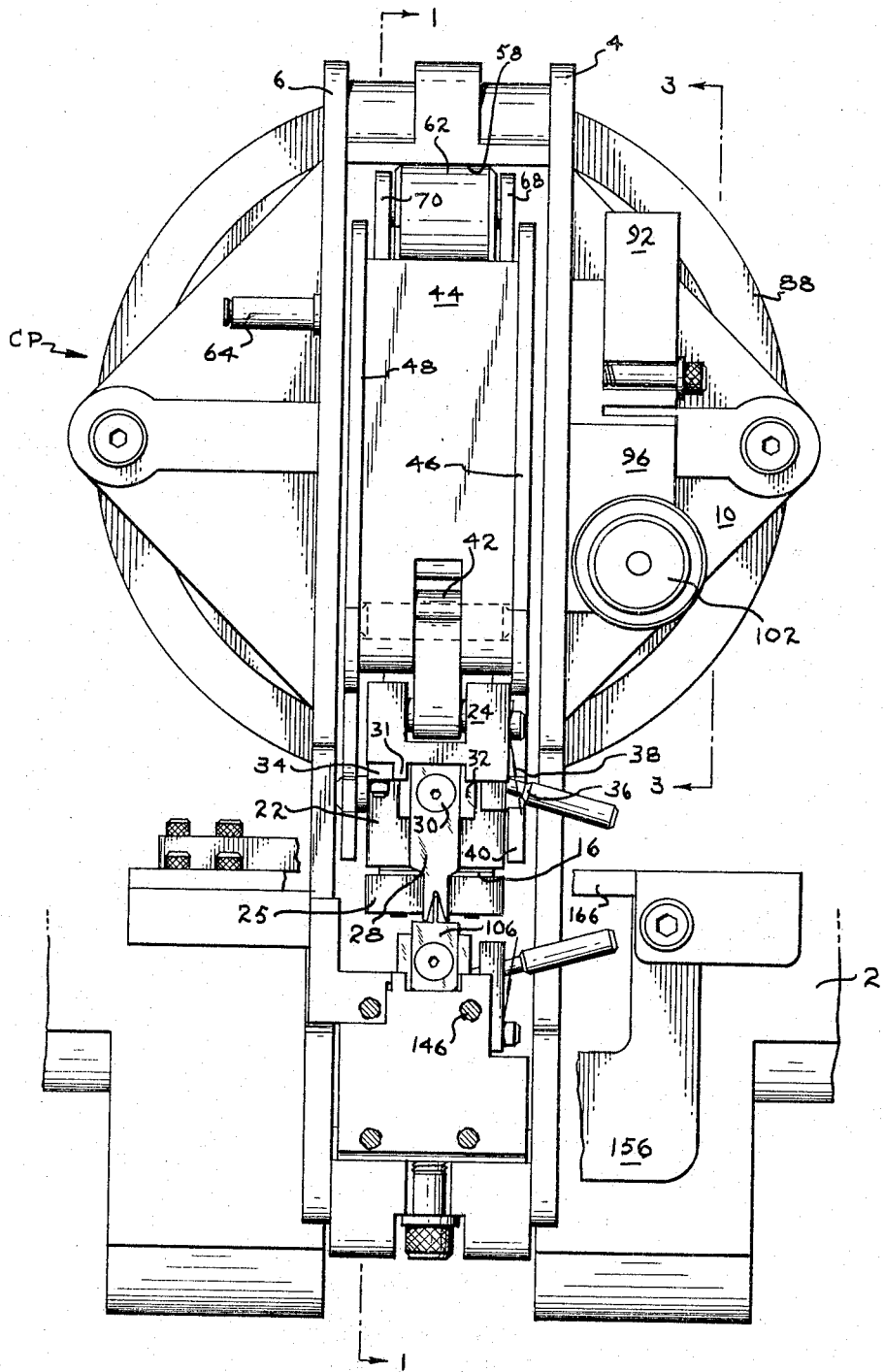
FIGURE 2 is a front elevational view of the crimping press.

Referring first to FIGURES 1 and 2, the attached drawing shows a crimping press CP for electrical contact terminals in side-by-side strip form. The press frame comprises a base plate 2 having a pair of upstanding parallel side plates 4, 6 between which the crimping dies, the suspending and guiding system for the dies, and the actuating mechanism are contained. Plates 4, 6 are secured by means of suitable fasteners to a spacer 8 integral with the base plate and to a mounting block 10 which is contained between the side plates at their rearward ends and suitably fastened to the base plate.

Mounting block 10 is cut away at its righthand side as viewed in FIGURE 1 to provide a seat 12 on which a pair of relatively wide and thin cantilever springs 14, 16 are mounted. The mounting means for these cantilevered springs may comprise a spacer block 18, a clamping bar 19, and suitable fasteners 20, the spacer block being clamped between the cantilever springs by means of the fasteners which extend through bar 19, both of the springs, and into block 10.

The forward ends of cantilever springs 14, 16 are rigidly connected together by means of a spacer block 22 and fasteners 26. Spacer block 22 is clamped between the forward ends of the cantilevers and the fasteners extend through a die mounting block 24, through spacer 22, and are threaded into a clamping bar 25 which is mounted on the underside of lower spring 16. A movable crimping die 28 is mounted on the underside of the block 24 and in front of the ends of the cantilever springs. Die 28 is secured by means of a fastener 30 to a shank 32 having flanges (not shown) extending from its upper sides. Shank 32 is positioned behind depending flanges 31 on the front of block 24 and is held in position on one side by a clamping bar 34, and on the other side by a pin 36. Clamping bar 34 is secured by fasteners to the underside of block 24 and overlaps the flanges on the shank. Pin 36 extends through, and is locked to, a leaf spring 38 secured to the side of die block 24 with the end of the pin extending inwardly beyond the flange on the die shank. The arrangement is such that the entire upper die can be quickly removed by merely pulling the pin rightwardly in FIGURE 3 against the biasing force of spring 38 and swinging the die and the mounting shank in a clockwise direction about its lefthand side to remove the die from engagement with clamping bar 34.

Figure 3:
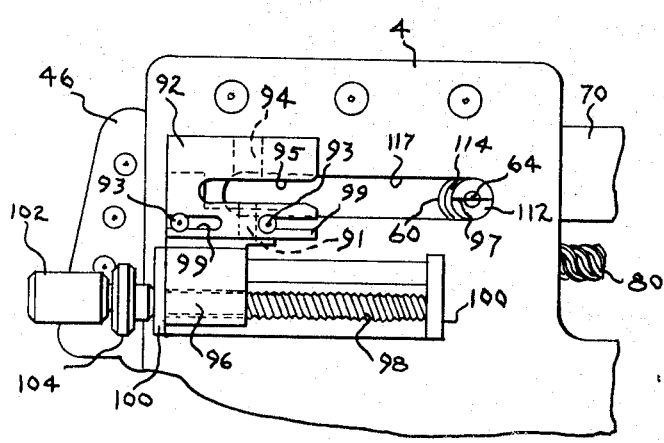
FIGURE 3 is a view taken along lines 3—3 of FIGURE 2.

Die mounting block 24 is connected by means of a link 42 to a spacer block 44 which is contained between and secured by suitable fasteners to a pair of cam support plates 46, 48 which are parallel to, and positioned between the opposing faces of frame plates 4, 6. As shown in FIGURES 1 and 3, link 42 is pivoted within a central recess in spacer block 44 and is pivotally connected in a similar recess in die block 24. It should be mentioned at this point that the weight of die mounting block 24 and die 28 is borne by link 42 rather than by springs 14, 16. In the preferred embodiment, these springs are relatively thin and would be incapable of supporting the weight of block 24 without flexure. These springs, thus, function only as a guiding means for the die.

Cam support plates 46, 48 each have rearwardly extending arms 50 which extend beside cantilever springs 14, 16 and which are pivotally mounted on a common pivot pin 52 in mounting block 10. It will be apparent that the arrangement is such that upon clockwise movement of the cam support plates 46, 48 about their pivotal axis 52 as viewed in FIGURE 1, a downward force will be applied to die mounting block 24, thus, causing downward movement of movable die 28 with concomitant flexure of the suspending and guiding system including cantilever springs 14, 16.

The pivotal motion of cam support plates 46, 48 is achieved by means of a pair of superimposed cam rollers 60, 62 which are movable rightwardly from the position of FIGURE 1. Lower roller 60 moves over a cam surface 56 on a cam block 54 which is positioned between and secured to the opposed sides of cam plates 46, 48. Upper roller 62, which is in tangential contact on its underside with the lower roller, moves over a cam surface 58 on the underside of a fixed camming block which extends between, and is secured to the opposed faces of frame plates 4, 6. Cam surface 56 is convergent with respect to cam surface 58 when the parts are in the positions of FIGURE 1 so that upon the rightward movement of the cam rollers, cam plates 46, 48 will be forced downwardly in a clockwise swinging motion about their pivotal axis 52.

Cam rollers 60, 62 are mounted on shafts 64, 66 which extend between a pair of parallel arms 68, 70. Shaft 66 extends through suitable bearings in roller 62 and has its ends mounted in arms 68, 70. Lower shaft 64 extends through bearings in roller 60, through bushings 61 in each of the arms 68, 70, through guide rollers 114 (see FIGURE 3) in each of cam support plates 46, 48, and through guide rollers 112 in each of frame plates 4, 6. Rollers 114 are confined in elongated slots 116 in the cam plates and rollers 112 are confined in slots 117 in the frame plates to permit movement of cam rollers 60, 62 and arms 68, 70 from the position of FIGURE 1 to the actuated position.

Arms 68, 70 extend leftwardly as viewed in FIGURE 1 beyond the support plates and frame plates 4, 6. The ends of these arms are secured by fasteners 72 to an extension 74 on the upper side of a block 76 which straddles, and is pivotally secured to a nut 78 threadedly mounted on a power screw 80. Nut 78 may be of conventional design or, advantageously, may have suitable roller bearings or ball bearings therein to reduce the frictional losses between the nut and the power screw when the screw is rotated in the manner described below. One suitable type of commercially available nut has planetary bearings interposed between the nut and the threads of the power screw thereby to reduce the frictional losses when the nut moves relatively over the power screw during operation.

Powere screw 80 has an unthreaded end 82 which extends rearwardly through a suitable bearing in the upper end of the block 10 and is coupled as shown at 84 to output shaft 86 of an electric motor 88. This motor should advantageously be of a type which can be readily reversed and should have an armature having a relatively low inertia since the motor must be reversed within a short time interval during each complete operating cycle of the press. A suitable type of motor, for example, is a printed circuit armature motor of the type produced by Printed Motors Incorporated of Glen Cove, N.Y.

It will be apparent from the foregoing description that rotation of the power screw causes movement of the cam rollers 60, 62 along a straightline path extending parallel to the axis of the power screw, the direction of movement of the cam rollers being dependent upon the direction of rotation of the power screw. The inclination of the cam surface 56 with respect to the fixed cam surface 58 is such that upon rightward movement of the cam rollers from the position of FIGURE 1 to the actuated position, cam support plates 46, 48 are swung in a clockwise direction about their pivotal axis 52 thereby to move die 28 relatively towards fixed die 106. Slots 117 in the frame plates, in which rollers 112 are contained, extend parallel to the path of reciprocation of the cam rollers since these frame plates are fixed. Slots 116 in the cam support plates, in which rollers 114 are contained, extend parallel to cam surface 56. It will be noted that slots 116 extend rearwardly beyond the cam surface 56 as indicated at 119 so that when the cam rollers move leftwardly from the position of actuation to the position of FIGURE 1, the rollers and shaft 64 are permitted to move leftwardly after the rollers have moved free of cam surface 56 and the upward stroke of die 28 has been completed. This final portion of the return stroke of the rollers is utilized to actuate a terminal strip-feeding mechanism which is not shown but is fully described in the above-mentioned copending application and in U.S. patent application, Ser. No. 347,404, filed Feb. 26, 1964, now U.S. Patent No. 3,266,558 and also assigned to the present assignee.

Figure 4:
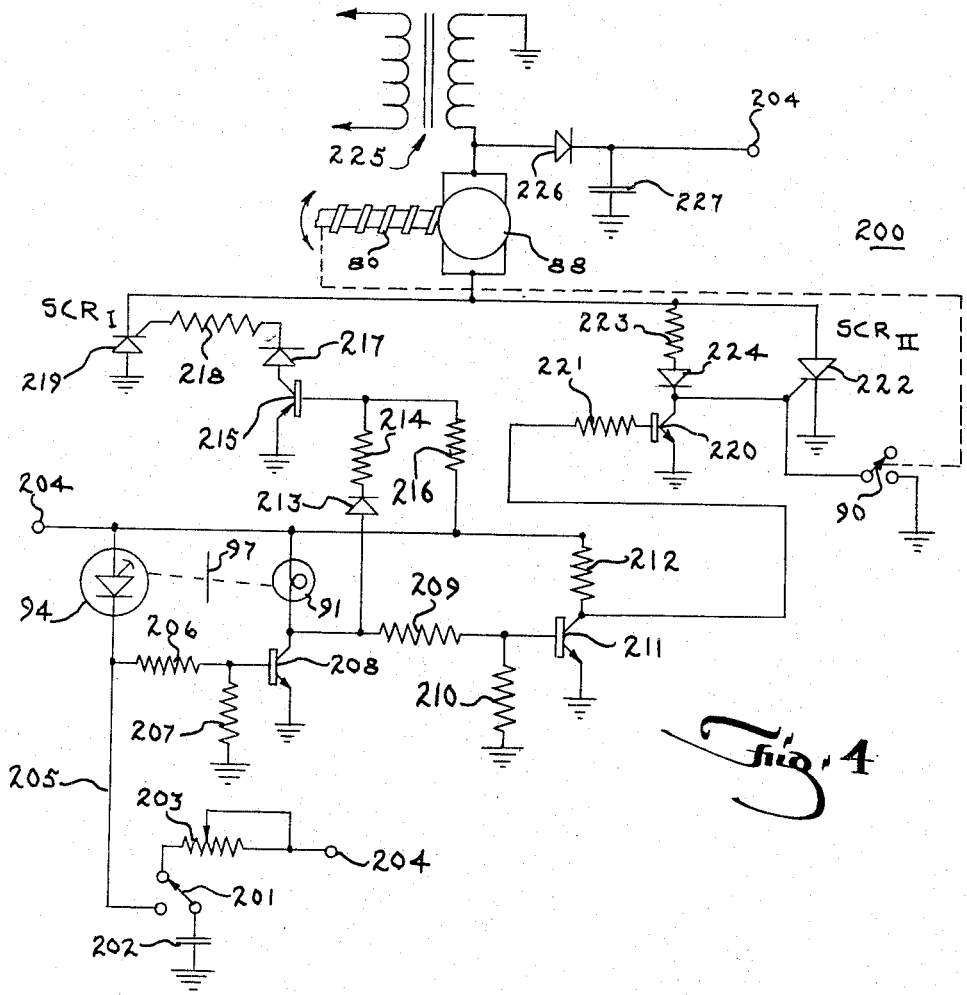
FIGURE 4 is a schematic circuit diagram of the electrical circuit control means that controls the operation of the embodiment of FIGURE 1.

The operation of the press is controlled by a control circuit 200 illustrated in FIGURE 4 and including a switch 90 which is engaged by an extension on block 76 (not shown) during leftward movement of the nut over the power screw to stop the motor at the end of an operating cycle. Starting of the motor may be accomplished by a foot switch 201 (FIGURE 4) or by a switch which is mounted behind the dies and which is closed upon positioning a wire end between the crimping dies. Reversal of the motor at the end of the downward stroke of the movable die is controlled by means of a photoelectric cell 94 (FIGURE 3) mounted in a block 92 adjustably secured to the external surface of frame plate 4. The beam of a light source 91 is directed transversely across a slot 95 in block 94 and a shutter 97, mounted on the projecting end of shaft 64, enters this slot during forward motion of rollers 60, 62. When the shutter passes through and interrupts the light beam, control circuit 200 is energized to bring about reversal of the drive motor 88.

Referring now to FIGURE 4, one contact of switch 201 is connected to ground via capacitor 202, another contact is connected to a potentiometer 203 which, in turn, is connected to a source of supply 204 while the other contact is connected via lead 205 to one side of photoelectric cell 94. The other side of photoelectric cell 94 is connected to supply 204. Resistors 206, 207 are serially connected between lead 205 and ground.

The base of transistor 208 is connected to the junction of resistors 206, 207 while the emitter thereof is connected to ground. The collector of transistor 208 is connected to one side of light source 91 while the other side thereof is connected to supply 204. Resistors 209, 210 are connected in series between the collector of transistor 208 and ground. The base of transistor 211 is connected to the junction of resistors 209, 210 while the emitter thereof is connected to ground. The collector of transistor 211 is connected to supply 204 via resistor 212.

Diode 213 and resistor 214 are serially connected between the junction of the collector of transistor 208 and resistor 209 and the base of transistor 215. The emitter of transistor 215 is connected to ground. A resistor 216 is connected between supply 204 and the base of transistor 215.

The collector of transistor 215 is connected to serially connected diode 217 and resistor 218 which, in turn, is connected to the gate of silicon-controlled rectifier 219 and also designated $SCR_I$. The positive terminal of rectifier 219 is connected to ground while the negative terminal thereof is connected to one side of printed circuit motor 88.

The base of transistor 220 is connected via resistor 221 to the collector of transistor 211 while the emitter thereof is connected to ground. The collector of transistor 220 is serially connected to the gate of silicon-controlled rectifier 222 and to one contact of switch 90. Rectifier 222 is also designated $SCR_{II}$. The other contact of switch 90 is connected to ground. The negative terminal of rectifier 222 is connected to ground while its positive terminal is connected to one side of motor 88. A serially connected resistor 223 and diode 224 are connected between the positive terminal of rectifier 222 and the collector of transistor 220.

The other side of motor 88 is connected to one side of the secondary winding of transformer 225 which also provides source of supply 204 via diode 226 and capacitor 227 which has one side connected to ground. The other side of the secondary winding is connected to ground. The primary winding of transformer 225 is connected to a source of supply such as 110 volts A.C. Thus, transformer 225 is a step down transformer which steps down the input voltage to an RMS value to match the voltage required by motor 88 and diode 226 and capacitor 227 to form low voltage D.C. power supply 204 for the transistors used as control elements for the SCR's.

$SCR_I$ and $SCR_{II}$ are connected in series with motor 88, but opposing in polarity, so that turning on $SCR_I$ but not $SCR_{II}$ places one polarity of voltage on the PCM, and turning on $SCR_{II}$ but not $SCR_I$ reverses this polarity across the motor, and, thus, reverses the direction of the rotation of the motor shaft. Due to the high switching speed of the SCR's, i.e., microseconds, and the inherent ability of the PCM to change its direction of rotation from full speed in one direction to full speed in the reverse direction in less than one revolution, a high degree of accuracy can be obtained when driving the ball screw.

Operation of the control circuit is according to the following:

In a normal cycle, the machine is at rest when a mechanical stop on ball screw 76 holds switch 90 closed. This shorts the gate of $SCR_{II}$ to its cathode, keeping $SCR_{II}$ turned off.

Also, switch 201, not activated, no current flows through transistor 208 since it is now in the off condition and supply 204 appears at the collector of transistor 208. Supply 204 is applied to the base of transistor 215 through diode 213 and resistor 214, thereby reverse biasing this transistor, and turning it to its off condition. Since transistor 215 is in the off condition, it appears as a high resistance in series with the gate of $SCR_I$, limiting the gate current to $SCR_I$ to a value which is too low to turn $SCR_I$ on, thus, not allowing current to flow therethrough.

Since both $SCR_I$ and $SCR_{II}$ are turned off, no current can flow through the PCM and no motion results.

Capacitor 202 is charged to the voltage level of supply 204 through potentiometer 203 and the normally closed position of switch 201. When switch 201 is moved to the other contact, the charge on capacitor 202 flows into the base of transistor 203 through the bias networks of resistors 206, 207, turning transistor 208 on. When transistor 208 turns on, current flows through light bulb 91 lighting the bulb, whose light falls on photoelectric cell 94 which a light dependent diode that will conduct electricity as long as light falls on it. Since photoelectric cell 94 is now conducting, current now flows therethrough into the base of transistor 208 keeping it turned on as long as the light path from bulb 91 to cell 94 is not interrupted by shutter 97.

With transistor 208 turned on, the voltage which held transistor 215 turned off through diode 213 and resistor 214 has been removed, and transistor 215 is turned on by current flowing through resistor 216 from supply 204. When transistor 215 turns on, sufficient gate current flows to turn $SCR_I$ on, allowing half-wave rectified current to flow through the PCM, turning screw 80 in one direction.

As the screw moves with the motor shaft, the mechanical stop which held switch 90 closed is moved away causing this switch to be opened. However, $SCR_{II}$ does not turn on as transistor 220 still holds $SCR_{II}$'s gate near the voltage of the cathode, through the following action. When transistor 220 turns on, the base of transistor 211 is placed near ground by the low resistance of transistor 220, and transistor 211 turns off, allowing current to flow into the base of transistor 220 thereby turning it on and shortening the gate of $SCR_{II}$ to the cathode as long as light 91 is energized, i.e., as long as transistor 208 is on.

Thus far, the PCM has started to run in one direction and is now fully under electronic control, since the stop has moved away from switch 90. In this state, transistors 215, 220 and 208 are all turned on, and transistor 211 is turned off. The light path from light 91 to cell 94 is holding the circuit on, and will maintain the motor turning at full power in one direction as long as the light path is not interrupted.

To reverse the direction of rotation of the motor, the only necessary thing is to interrupt the light path from light 91 to cell 94 such that cell 94 will not conduct and transistor 208 will turn off. When transistor 208 turns off, light 91 goes out, source 204 is again applied to transistor 215 through diode 213 and resistor 214 thereby turning transistor 215 off. This places a high resistance in the gate circuit of $SCR_I$, limiting the gate current to a value too low to turn $SCR_I$ on, and the current polarity reversal across $SCR_I$ and the PCM turns $SCR_I$ off.

At the same time (in microseconds), the turning off of transistor 208 allows transistor 211 to draw base current, turning on this transistor. When transistor 211 turns on, it places the base of transistor 220 close to ground, turning it off. This essentially opens the short between the gate and cathode of $SCR_{II}$, allowing sufficient gate current to flow through diode 224 and its associated resistor to turn on $SCR_{II}$. When $SCR_{II}$ turns on, the polarity of the current through the PCM reverses, thus, reversing the direction of the rotation of the PCM as quickly as the mechanical inertia of the PCM will allow. As has been previously stated, this is a consistent period of less than one revolution of the motor shaft. Thus, this control can be used to very precisely reverse a motion controlled by the motor shaft.

To stop the PCM, switch 90 is again closed, shorting gate to cathode of $SCR_{II}$, which is then turned off by the polarity reversal across it.

This control circuit has been successfully used to control precisely (±.0005″) the crimp height in the press as described above.

The shut height of the crimping dies can be changed by merely adjusting the location of photoelectric cell 94 and its light source 91 along the path of movement of shaft 64. In order to permit such adjustment, block 92 is secured to a boss 96 by means of screws 93 which extend through elongated slots 99 into the boss. An adjusting screw 98 which is threaded through this boss is journalled in a pair of spaced apart plates 100 and has a forwardly projecting end on which a finger piece 102 is provided so that rotation of the finger piece has the effect of moving the boss and, therefore, photoelectric cell 94 and its associated light source rightwardly or leftwardly as viewed in FIGURE 3. Advantageously, a lock nut 104 is provided on the forwardly projecting end of screw 98 so that block 92 can be securely locked in a given position of adjustment.

It is to be noted that the control circuit of the present invention is not to be limited to the press described herein and is capable of being used on any mechanical device where precise control of such device is essential for optimum operation. Thus, there has been disclosed a unique and novel control circuit which operates within a minimum of tolerance.

It will, therefore, be appreciated that the aforementioned and other desirable objects have been achieved; however, it should be emphasized that the particular embodiment of the invention, which is shown and described herein, is intended as merely illustrative and not as restrictive of the invention.

What is claimed is:

1. A control system for an electric motor having an armature and a field winding comprising a source of supply connected to one side of said electric motor, a first and second solid-state switch means connected to the other side of said motor means with said first solid-state switch means providing a polarity thereto opposite to that of said second solid-state switch means, first circuit means connected to said first solid-state switch means for normally keeping said first solid-state switch means in a nonconducting state or for causing said first solid-state switch means to be in a conducting state to drive said electric motor in one direction, second circuit means connected to said second solid-state switch means for normally keeping said second solid-state switch means in a nonconducting state or for causing said second solid-state switch means to be in a conducting state to drive said electric motor in another direction, and control circuit means associated with said electric motor and connected to said first and second circuit means for causing said first circuit means to keep said first solid-state switch means in said conducting state for a predetermined time while said electric motor is being driven in said one direction, and after said predetermined time to render said first solid-state switch means to said nonconducting state and to cause said second circuit means to initiate said second solid-state switch means into said conducting state to quickly drive said electric motor in the other direction.

2. A control system according to claim 1 wherein said first circuit means includes a manually operated switch means and transistor means connected thereto.

3. A control system according to claim 1 wherein said second circuit means includes switch means operated by said electric motor and transistor means connected thereto.

4. A control system according to claim 1 wherein said control circuit means includes photoelectric circuit means.

5. A control system according to claim 1 wherein said control circuit means includes switching means having a movable means movable by said electric motor to operate said switching means to change said first circuit means from said conducting state to said non-conducting state and to change said second circuit means from said non-conducting state to said conducting state to reverse direction of said electric motor, and additional switching means operable by said electric motor to change said second circuit means from said conducting state to said non-conducting state to stop said electric motor.

6. A control system comprising a source of supply connected to one side of a load, a first and second solid-state switch means connected to the other side of said load with said first solid-state switch means providing a polarity thereto opposite to that of said second solid-state switch means, first circuit means connected to said first solid-state switch means for normally keeping said first solid-state switch means in a nonconducting state or for causing said first solid-state switch means to be in a conducting state to apply a voltage of one polarity to said load, second circuit means connected to said second solid-state switch means for normally keeping said second solid-state switch means in a nonconducting state or for causing said second solid-state switch means to be in a conducting state to apply a voltage of another polarity to said load, and control circuit means associated with said load and connected to said first and second circuit means for causing said first circuit means to keep said first solid-state switch means in said conducting state for a predetermined time while said load is receiving said one polarity, and after said predetermined time to render said first solid-state switch means to said nonconducting state and to cause said second circuit means to initiate said second solid-state switch means into said conducting state to quickly apply said other polarity to said load.

7. A control system according to claim 6 wherein said control circuit means includes photoelectric circuit means.

References Cited

UNITED STATES PATENTS

| | | | |
|---|---|---|---|
| 3,032,697 | 5/1962 | Kirk | 318—293 |
| 3,144,598 | 8/1964 | Merritt | 318—480 X |
| 3,146,390 | 8/1964 | Wolff | 318—293 X |
| 3,263,146 | 7/1966 | Brosious | 318—293 |

OTHER REFERENCES

Scalone and Wheeler, "Motor Control System," IBM Technical Disclosure Bulletin, vol. 6, No. 10, March 1964, 318–293.

Scalone, "Reversible Motor Control" IBM Technical Disclosure vol. 5, No. 12, May 1963 p. 54.

ORIS L. RADER, *Primary Examiner.*

J. C. BERENZWEIG, J. J. BAKER,
*Assistant Examiners.*